United States Patent [19]

Flournoy et al.

[11] 4,134,415
[45] Jan. 16, 1979

[54] PIPELINE TRANSPORTATION OF HEAVY CRUDE OIL

[75] Inventors: Kenoth H. Flournoy, Kingsville; Robert B. Alston, Missouri City; William B. Braden, Jr., Houston, all of Tex.

[73] Assignee: Texaco Inc., New York, N.Y.

[21] Appl. No.: 802,146

[22] Filed: May 31, 1977

Related U.S. Application Data

[63] Continuation-in-part of Ser. No. 664,740, Mar. 8, 1976, abandoned.

[51] Int. Cl.$^2$ .......................... F17D 1/17; B01F 17/42
[52] U.S. Cl. .............................. 137/13; 252/8.55 D; 252/312; 252/355; 302/66; 546/172
[58] Field of Search .............. 252/8.3, 8.55 R, 8.55 D, 252/355; 137/13; 302/66

[56] References Cited

U.S. PATENT DOCUMENTS

| | | | |
|---|---|---|---|
| 2,328,727 | 9/1943 | Langer | 252/312 X |
| 2,535,677 | 12/1950 | Hollander et al. | 260/513 |
| 3,491,835 | 1/1970 | Gagle | 137/13 X |
| 3,731,741 | 5/1973 | Palmer et al. | 252/8.55 X |
| 3,827,497 | 8/1974 | Dycus et al. | 252/8.55 X |
| 3,943,954 | 3/1976 | Flournoy et al. | 137/13 |
| 3,950,034 | 4/1976 | Dreher et al. | 137/13 X |
| 4,048,078 | 9/1977 | Allen | 252/8.55 X |

*Primary Examiner*—Herbert B. Guynn
*Attorney, Agent, or Firm*—Carl G. Ries; Thomas H. Whaley; Walter D. Hunter

[57] ABSTRACT

A method for transporting heavy crude oil through a pipeline which involves introducing into a pipeline or well-bore with the viscous hydrocarbons an aqueous solution containing (1) a sulfonate surfactant, (2) a rosin soap or a naphthenic acid soap and, optionally (3) a coupling agent whereby there is spontaneously formed a low viscosity, salt tolerant, oil-in-water emulsion.

5 Claims, No Drawings

PIPELINE TRANSPORTATION OF HEAVY CRUDE OIL

This is a continuation-in-part of application Ser. No. 664,740, filed Mar. 8, 1976, now abandoned.

BACKGROUND OF THE INVENTION

1. Field of the Invention

This invention relates to an improved method for transporting viscous hydrocarbons through a pipeline or well-bore. More particularly, this invention relates to the introduction into a pipeline of a viscous hydrocarbon or mixture of hydrocarbons together with an aqueous solution of an organic sulfonate, a rosin soap or a naphthenic acid soap and, optionally, a coupling agent such as ethylene glycol monobutyl ether, whereby a low viscosity, salt-tolerant, oil-in-water emulsion is formed which facilitates movement of the heavy oils through the pipeline. If desired, the solution may contain an added alkalinity agent.

2. Description of the Prior Art

The transportation of heavy crudes by pipeline is difficult because of their low mobility and high voscosity. The usual methods to facilitate the flow of heavy crudes have included cutting them with lighter fractions of hydrocarbons. However, the procedures involve the use of relatively large amounts of expensive hydrocarbon solvents to transport a relatively cheap product. The practice also necessarily requires the availability of the cutting hydrocarbon solvents which, in some instances, is inconvenient.

Another method to assist the flow of hydrocarbons in pipeline is the installation of heating equipment at frequency intervals along the pipeline whereby the crude is heated to reduce its viscosity and thereby facilitate its transport. Heaters employed for this purpose can be operated by withdrawing some of the crude being transported for use a fuel. However, this procedure may result in the loss of as much as 15 to 20% of the crude being transported.

Other methods to facilitate transport of heavy crudes have employed thermal viscosity breaking, which, however, produces substantial amounts of gas.

It is known that substantial amounts of water may be introduced into a pipeline containing a stream of viscous crude flowing therethrough to reduce the drag on the stream and thus facilitate the flow through the pipeline. This has been done by the addition of water together with crude into the pipeline such that a water-in-oil emulsion is formed.

It is thus an object of the present invention to provide a transport method for viscous crudes which are difficult to emulsify especially in the presence of water with substantial salt content whereby they can be more easily transported by pipeline at a high throughput rate.

SUMMARY OF THE INVENTION

This invention relates to a method for transporting viscous hydrocarbons such as heavy crude oils in which the hydrocarbon together with an aqueous solution of (1) a sulfonate surfactant selected from the group consisting of alkyl sulfonates, and ethoxylated alkyl or alkaryl sulfonates, (2) a rosin soap or a naphthenic soap and, optionally, (3) a coupling agent such as a glycol mono ether, and/or an alkalinity agent is introduced into the pipeline with mixing. During the mixing operation an oil-in-water emulsion is formed which is stable in hard water and salt tolerant.

DESCRIPTION OF THE INVENTION

In this invention the aqueous solution added to the viscous hydrocarbon will generally range from a minimum of about 15 percent by volume based on the volume of the hydrocarbon introduced into the pipeline up to a maximum of about 35 percent or more by volume with the preferred amount being about 20 to about 30 percent by volume on the same basis. In the aqueous solution the concentration of the sulfonate surfactant will range from about 0.01 to about 2.0 weight percent; the rosin soap or the naphthenic acid soap from about 0.01 to about 1.8 weight percent and the optionally present coupling agent of from 0.02 to about 1.0 weight percent. Mixtures of the above-mentioned ingredients may also be used in the process of this invention.

Sulfonate type surfactants which may be utilized in the process of this invention include alkyl sulfonates and alkoxylated alkyl or alkaryl sulfonates.

One type of useful sulfonates includes compounds of the following general formula:

$$R - SO_3 - Y \qquad (I)$$

wherein R is an alkyl radical, linear or branched, having 5 to 25 and, preferably, from 8 to 14 carbon atoms and Y is a monovalent cation such as sodium, potassium or the ammonium ion. For example, if R is linear dodecyl and Y is the ammonium radical, then the compound is ammonium dodecyl sulfonate.

Another group of sulfonate surfactants which are especially suitable includes compounds of the formula:

$$R_a O (CH_2CH_2O)_x CH_2CH_2SO_3M, \qquad (II)$$

wherein $R_a$ is selected from the group consisting of alkyl of from 8 to 26 carbon atoms and

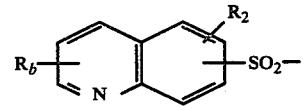

wherein $R_b$ is selected from the group consisting of hydrogen and alkyl of from 1 to 5 carbon atoms, $R_c$ is selected from the group consisting of hydrogen and alkyl of from 1 to 5 carbon atoms and x is an integer of from 1 to 20 and M is a metallic cation such as sodium or potassium or ammonium ion.

One method of preparing the Type II sulfonates described above is as follows. A polyethoxylated alkanol is first reacted with sulfurous oxychloride ($SOCl_2$) in order to replace the terminal hydroxyl group with a chlorine, which may then be reacted with sodium sulfite, $Na_2SO_3$, to form the desired polyethoxylated alcohol sulfonate.

The above mode of formulating the desired sulfonate salt of the polyethoxylated alcohol by first forming the halide and then reacting it with sulfite (the Strecker reaction) is believed to be the preferred method of synthesizing the compound of the present invention. Another possible route involves forming the sulfate salt and then reacting the sulfate salt with sodium sulfite. Drastic reaction conditions are necessary to force this latter reaction to go, however, e.g., about 200° C. for at least 12 hours.

Type II sulfonates where $R_a$ is:

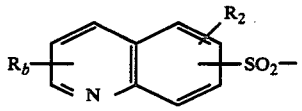

can be prepared for example, by reacting the corresponding quinoline sulfonic acid starting material with, for example, phosphorus pentachloride to form the quinoline sulfonyl chloride which in turn may then be reacted with a polyethylene glycol of suitable molecular weight to yield the ethoxylated sulfonyl quinoline derivative. Preparation of such ethoxylated derivatives is more completely described in U.S. Pat. No. 3,731,741 which is incorporated herein in its entirety. Once the ethoxylated quinoline precursor has been prepared it can be sulfonated in the manner previously described to yield the corresponding sulfonate of the formula:

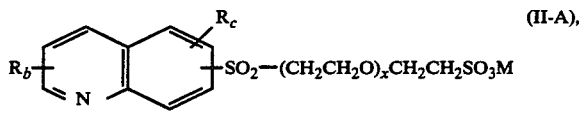
(II-A), wherein $R_b$, $R_c$, x and M have the same meaning as set out above.

Typical Type II A sulfonates which are useful in the method of this invention include:

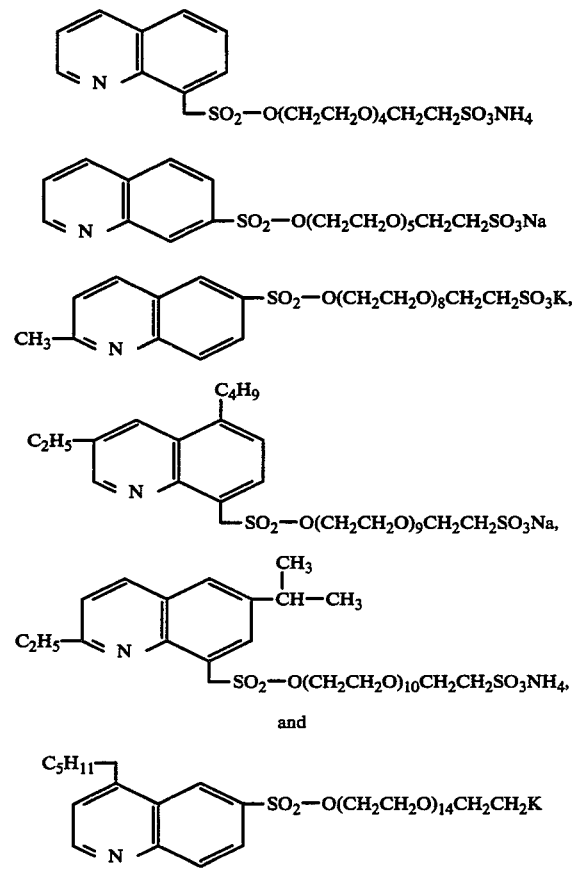

A wide variety of rosin soaps may be utilized in the method of this invention as exemplified by sodium abietate, potassium abietate, ammonium abietate, etc. Mixtures of these same rosin soaps may be employed if desired. Suitable naphthenic acid soaps include sodium naphthenate, potassium naphthenate, ammonium naphthenate, etc. and mixtures thereof.

Glycol monoalkyl ethers useful in the process of this invention include compounds of the formula:

$$R_cO(R_dO)_mH,$$

wherein $R_c$ is alkyl of from 1 to 6 carbon atoms, $R_d$ is alkylene of from 2 to 3 inclusive carbon atoms and m is an integer of from 1 to 3 inclusive. Examples of glycol monoalkyl ethers suitable for use in this invention include ethylene glycol monometyl ether, diethylene glycol monoethyl ether, triethylene glycol monopropyl ether, propylene glycol monomethyl ether, dipropylene glycol monoethyl ether, triethylene glycol monobutyl ether, tetrapropylene glycol monoethyl ether, etc.

The alkaline agent, if employed, is selected from the group consisting of the alkali metal hydroxides as exemplified by sodium hydroxide, potassium hydroxide, mixtures thereof, etc. which are generally added to the aqueous solution in an amount of from about 0.05 to about 1.0 weight percent.

In another aspect this invention relates to an oil-in-water emulsion comprising a hydrocarbon such as crude oil including heavy crude oil, diesel oil, fuel oil, propane, propane-butane mixtures as exemplified by LPG, etc., and as the aqueous phase an aqueous solution comprising about 0.01 to 2.0 percent by weight of the sulfonate surfactant and about 0.01 to about 1.8 percent by weight of a soap selected from the group consisting of rosin soaps, naphthenic acid soaps and mixtures. Such emulsions are useful in a wide variety of other applications such as in secondary recovery operations, etc. These emulsions are prepared by mixing together the hydrocarbon and the aqueous solution. The amount of the aqueous solution added to the hydrocarbon will generally range from a minimum of about 15 percent by volume based on the volume of the hydrocarbon up to a maximum of about 35 percent or more by volume with the preferred amount being about 20 to about 30 percent by volume on the same basis. Optionally, the aqueous solution may contain from about 0.02 to about 1.0 weight percent of a coupling agent of the type previously described and/or an alkalinity agent also of the type previously described in an amount of from 0.05 to about 1.0 weight percent.

In another embodiment of this invention relates to the above-described aqueous solutions employed to prepare oil-in-water emulsions of this invention and which are useful in a wide variety of other applications such as cleaning the well bore of injection wells to permit increased injection rates into the formation in secondary recovery operations.

The following examples illustrate embodiments of this invention which are to be considered not limitative:

EXAMPLE I

An aqueous solution containing 0.8 weight percent of sodium dodecyl sulfonate, 0.10 weight percent of potassium abietate, and about 0.35 weight percent of diethylene glycol monobutyl ether is prepared by adding with mixing the above-mentioned ingredients to water having salinity of about 1.73 weight percent at a temperature of about 25° C after which the thus-prepared solution is introduced with mixing into a large diameter pipeline together with sufficient heavy California crude from Orange County, California to give an oil-in-water emulsion in which the amount of aqueous solution is about 22 percent by volume based on the volume of the crude. The horsepower requirement for transporting the formed oil-in-water emulsion through the pipeline at the rate of 2000 barrels per day is found to be substantially less than the horsepower requirement for transporting the same volume of this California heavy crude under the same conditions.

EXAMPLE II

An aqueous solution comprising about 0.13 weight percent ammonium tetrodecyl sulfonate, 0.20 weight percent of a sulfonate of the formula:

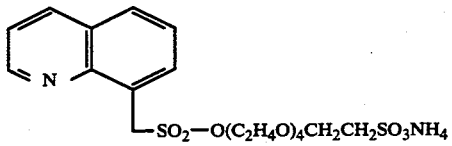

0.10 weight percent sodium abietate, 0.15 weight percent potassium naphthenate and about 0.10 weight percent sodium hydroxide is formed by mixing together at a temperature of about 25° C. the above-named ingredients with brine having a salinity of about 1.77 weight percent. The thus-formed aqueous solution is introduced into a pipeline together with Hunton crude, Hunton County, Oklahoma to give an oil-in-water emulsion in which the volume percent of the aqueous solution based on the volume of the crude is about 22 percent. An appreciable saving in horsepower through the pipeline over the requirement for the same amount of Hunton crude under the same conditions is achieved.

Another embodiment of this invention relates to a process for the recovery of hydrocarbons from subterranean hydrocarbon-bearing formations having in communication therewith at least one injection well and one production well in which there is injected into the formation via the injection well an aqueous solution of the type previously described which comprises a sulfonate surfactant, a rosin or naphthenic acid soap and, optionally, a coupling agent, and hydrocarbons are recovered via the production well.

In recovering oil from oil-bearing reservoirs it usually is possible to recover only a minor part of the original oil in place by the primary recovery methods which utilize the natural forces present in the reservoir. As a result, a variety of supplemental recovery techniques have been utilized to increase the recovery of oil from subterranean hydrocarbon-bearing reservoirs or formations. Although these supplemental techniques are commonly referred to as secondary recovery operations in fact they may be primary or tertiary in sequence of employment. In such techniques, a fluid is introduced into the formation in order to displace the oil therein to a suitable production system through which the oil may be withdrawn to the surface of the earth. Examples of displacing mediums include gas, aqueous liquids such as fresh water or brine, oil-miscible liquids such as butane, or a water and oil-miscible liquid such as alcohol. Generally, the most promising of the secondary recovery techniques is concerned with the injection into the formation of an aqueous flooding medium either alone or in combination with other fluids.

This embodiment of the invention relates to a method for recovering hydrocarbons from a subterranean hydrocarbon-bearing formation having in communication therewith at least one injection well and one production well comprising:

(a) injecting into the said formation through the said injection well an aqueous solution comprising a sulfonate surfactant and a rosin or naphthenic acid soap, (b) forcing the said aqueous solution through the formation, and (c) recovery hydrocarbons through the said production well.

Any of the type I, II, and II-A sulfonates previously described may be employed in the aqueous solution of step (a) above. Suitable rosin soaps include, for example, sodium abietate, potassium abietate, etc. and mixtures thereof. Useful naphthenic acid soaps include materials such as sodium, potassium and ammonium naphthenates. Coupling agents, if utilized in the aqueous solution may be, for example, any of the glycol monoalkyl ethers as defined previously. An alkalinity agent such as sodium hydroxide or potassium hydroxide may, if desired, be added to the aqueous solution.

The aqueous solution utilized in the recovery process will comprise about 0.01 to 2.0 percent by weight of the sulfonate surfactant, about 0.01 to about 1.8 percent by weight of the soap, about 0.02 to about 1.0 weight percent of the optionally included coupling agent and/or an alkalinity agent in an amount of from 0.05 to about 1.0 weight percent.

The process of this invention can be carried out with a wide variety of injection and production systems which will comprise one or more wells penetrating the producing strata or formation. Such wells may be located and spaced in a variety of patterns which are well-known to those skilled in the art. For example, the so-called "line flood" pattern may be used, in which case the injection and producing systems are composed of rows of wells spaced from one another. The recovery zone, i.e., that portion of the production formation from which hydrocarbons are displaced by the drive fluid to the production system, in this instance will be that part of the formation underlying the area between the spaced rows. Another pattern which is frequently used is the so-called "circular flood" in which the injection system comprises a central injection well while the production system comprises a plurality of production wells spaced about the injection well. Likewise, the injection and production systems each may consist of only a single well and here the recovery zone will be that part of the producing strata underlying an elliptical-like area between the two wells which is subject to the displacing action of the aqueous drive fluid. For a more elaborate description of such recovery patterns reference is made to Uren, L. C., *Petroleum Production Engineering-Oil Field Exploitation,* Second Edition, McGraw Hill Book Company, Inc., New York, 1939, and to U.S. Pat. Nos. 3,472,318 and 3,476,182.

In conducting the process of this invention, the aqueous solution prepared as described above is forced, usually via a suitable pumping system, down the well bore of an injection well and into the producing formation through which it is then displaced together with hydrocarbons of the formation in the direction of a production well.

The formation may be treated continuously with the aqueous solution or such treatment may be temporary. If desired, however, after a time, conventional flooding may be resumed. The aqueous solution of this invention also may be applied in a modified water flood operation in which there is first injected into the well bore a slug of the aqueous solution which is forced under pressure into the subterranean formation. This first step is then followed by a similar injection step wherein a slug of an aqueous drive fluid, such as water, is injected, which is thereafter followed by a repetition of the two steps. This sequence may be repeated to give a continuous cyclic process. The size of the slugs may be varied within rather wide limits and will depend on a number of conditions, including the thickness of the formation, its characteristics and the conditions for the subsequent injection of the aqueous drive medium.

EXAMPLE III

Through a water injection well drilled into a limestone formation there is displaced under pressure down the tubing and into the formation at the rate of 75 barrels per day an aqueous solution of 0.09 weight percent of potassium decyl sulfonate, 0.15 weight percent of a sulfonate of the formula:

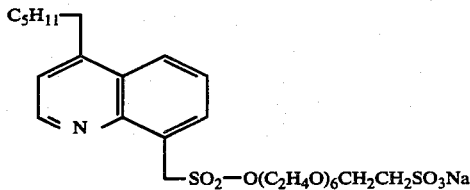

0.20 weight percent of potassium naphthenate and about 0.05 weight percent of sodium hydroxide formed by mixing together at a temperature of about 25° C the above-named ingredients with brine having a salinity of about 1.18 weight percent. After about 15 days the production of hydrocarbons is substantially increased over that obtained when brine alone is utilized as the drive fluid.

What is claimed is:

1. In the transportation of viscous hydrocarbons by pipeline, the improvement which comprises forming an oil-in-water emulsion by introducing into the pipeline with said hydrocarbons an aqueous solution comprising about 0.01 to about 2.0 percent by weight of surfactant of the formula:

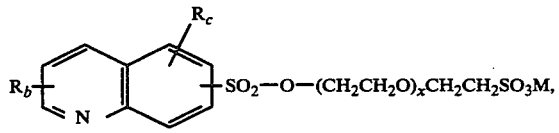

wherein $R_b$ is selected from the group consisting of hydrogen and alkyl of from 1 to 5 carbon atoms, $R_c$ is selected from the group consisting of hydrogen and alkyl of from 1 to 5 carbon atoms, x is an integer of from 1 to 20 and M is a monovalent cation selected from the group consisting of sodium, potassium, lithium and ammonium, and about 0.01 to about 1.8 percent by weight of a soap selected from the group consisting of rosin soaps and naphthenic acid soaps and mixtures thereof.

2. The method of claim 1 wherein the said rosin soaps is selected from the group consisting of sodium abietate, potassium abietate, lithium abietate, ammonium abietate and mixtures thereof.

3. The method of claim 1 wherein the said naphthenic soap is selected from the group consisting of sodium naphthenate, potassium naphthenate, lithium naphthenate, ammonium naphthenate and mixtures thereof.

4. The method of claim 1 wherein the said aqueous solution contains from 0.02 to about 1.0 weight percent of a coupling agent of the formula:

$$R_cO(R_dO)_mH,$$

wherein $R_c$ is alkyl of from 1 to 6 carbon atoms, $R_d$ is alkylene of from 2 to 3 inclusive carbon atoms and m is an integer of from 1 to 3 inclusive.

5. In the transportation of viscous hydrocarbons by pipeline, the improvement which comprises forming an oil-in-water emulsion by introducing into the pipeline with said hydrocarbons an aqueous solution comprising from about 0.01 to about 2.0 weight percent of a surfactant of the formula

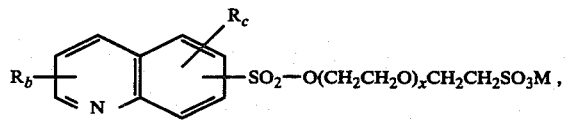

wherein $R_b$ is selected from the group consisting of hydrogen and alkyl of from 1 to 5 carbon atoms, $R_c$ is selected from the group consisting of hydrogen and alkyl of from 1 to 5 carbon atoms, x is an integer of from 1 to 20 and M is a monovalent cation selected from the group consisting of sodium, potassium, lithium and ammonium, and from about 0.01 to about 1.8 weight percent of a soap selected from the group consisting of a rosin soap and a naphthenic acid soap, from about 0.02 to about 1.0 weight percent of a coupling agent of the formula:

$$R_cO(R_dO)_mH,$$

wherein $R_c$ is alkyl of from 1 to 6 carbon atoms, $R_d$ is alkylene of from 2 to 3 inclusive carbon atoms and m is an integer of from 1 to 3 inclusive and from 0.05 to about 1.0 weight percent of an alkalinity agent selected from the group consisting of sodium hydroxide and potassium hydroxide.

* * * * *